United States Patent Office 3,546,043
Patented Dec. 8, 1970

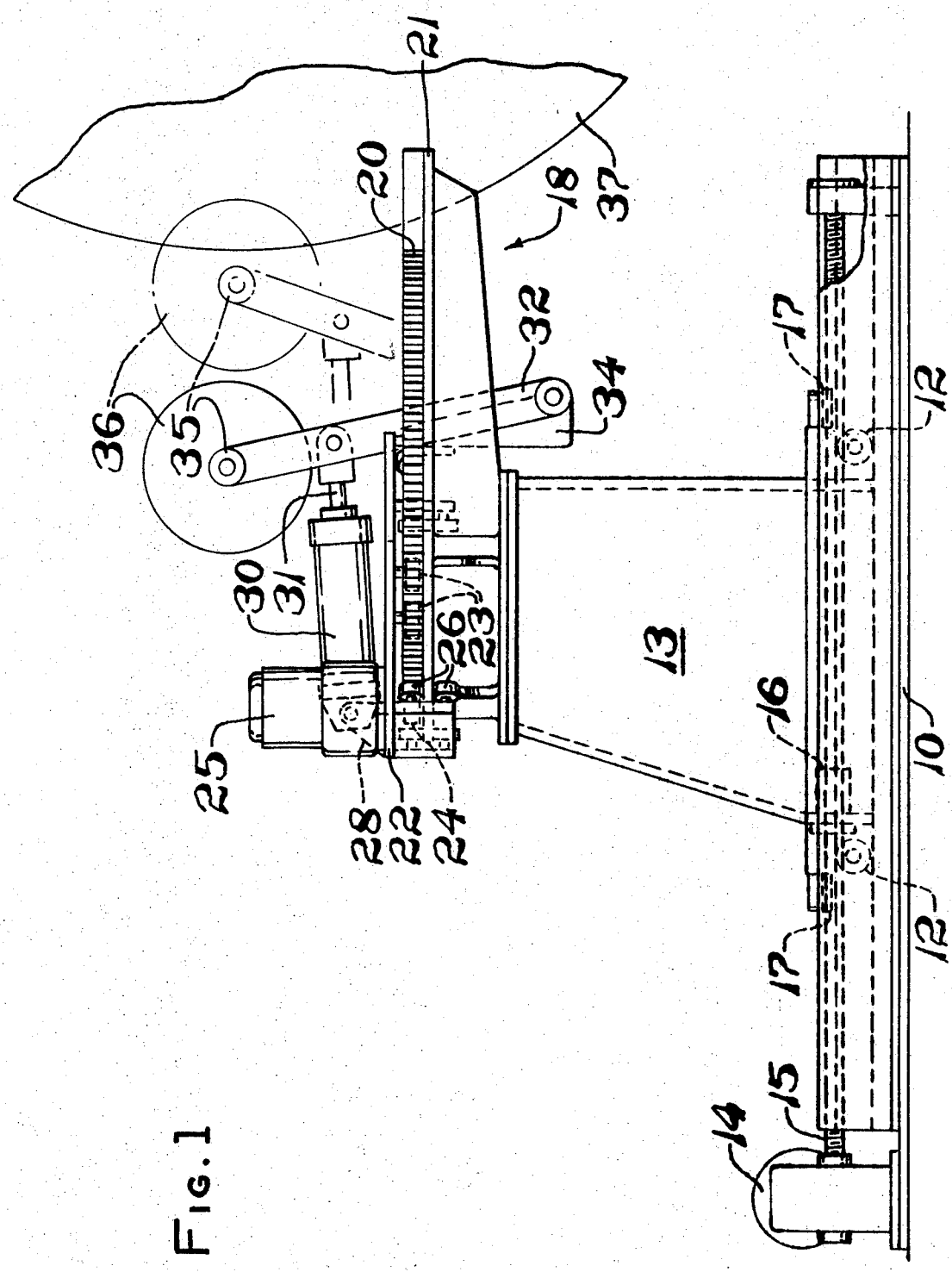

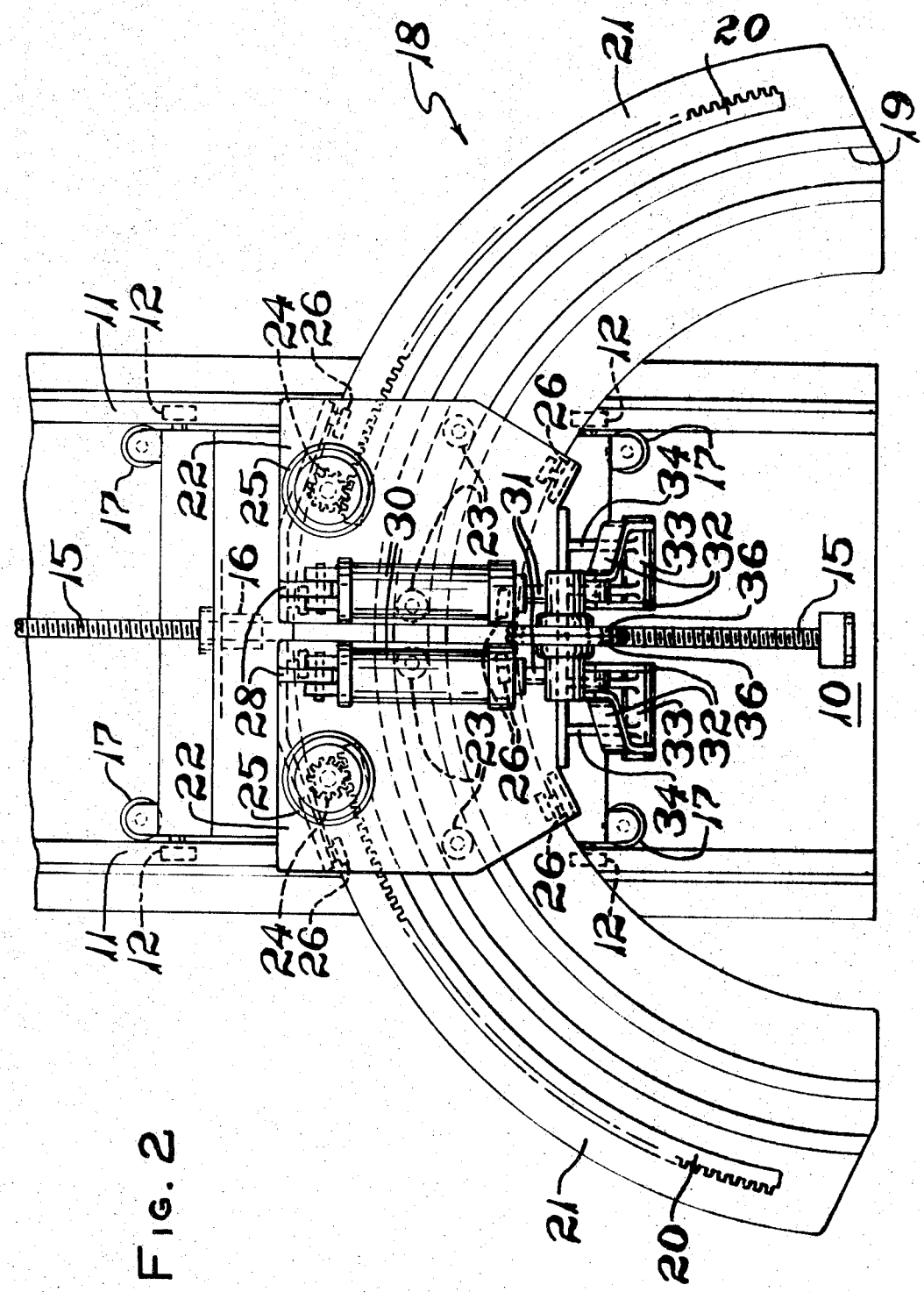

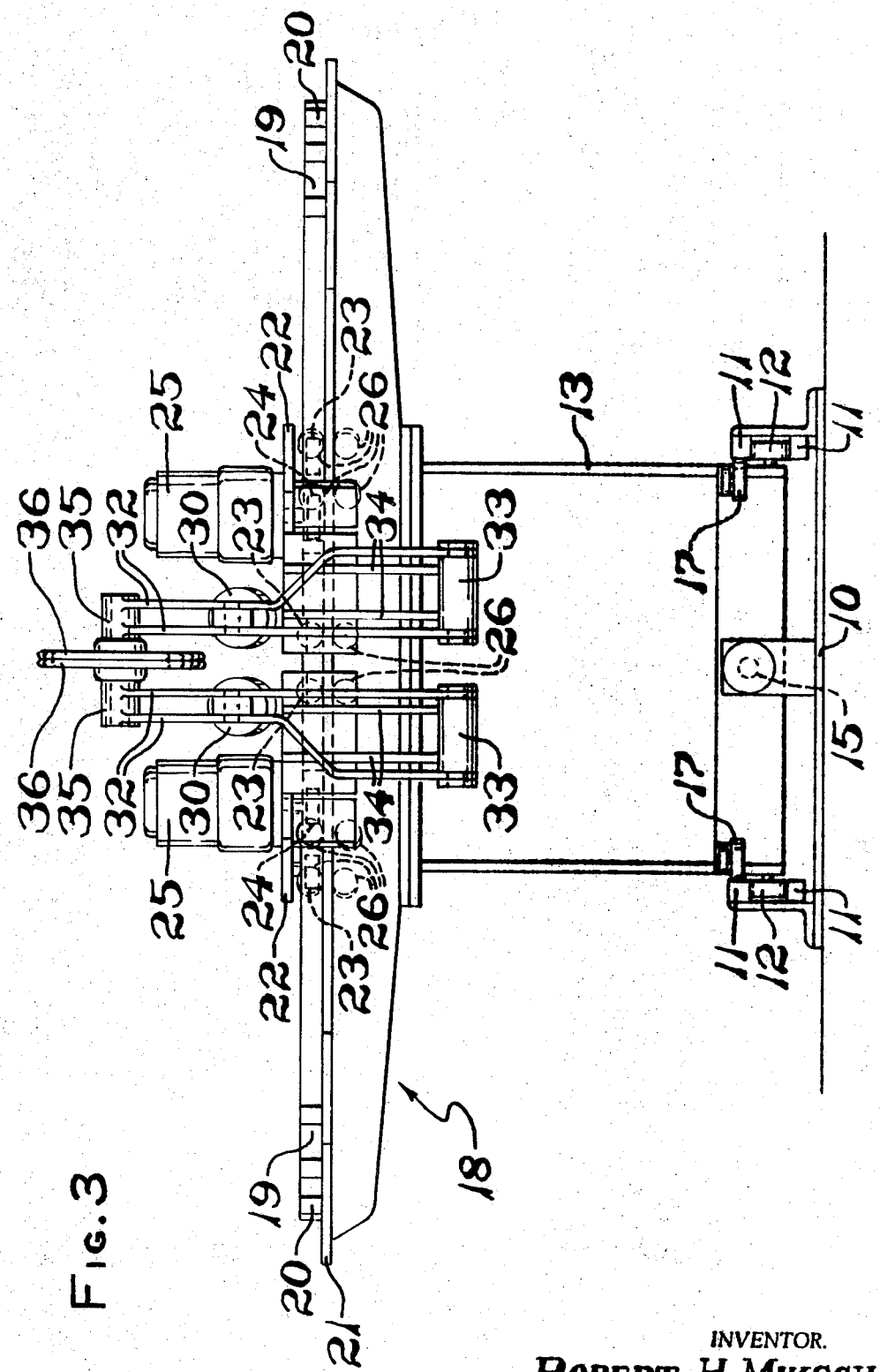

3,546,043
TIRE STITCHING APPARATUS
Robert H. Miksch, Akron, Ohio, assignor to The B. F. Goodrich Company, New York, N.Y., a corporation of New York
Filed Apr. 17, 1969, Ser. No. 816,983
Int. Cl. B29h 17/08
U.S. Cl. 156—410    4 Claims

ABSTRACT OF THE DISCLOSURE

A tire stitching apparatus having a longitudinally movable carriage supporting a pair of cross slides with radially movable stitching wheels thereon. The cross slides are movable in opposite arcuate directions patterned after the outside contour of the tire to be stitched.

BACKGROUND OF THE INVENTION

This invention relates to tire making machines, and more particularly to a new and improved stitching means for joining together the numerous plies of fabric of a tire carcass of a formed green tire on a building drum.

In the manufacture of pneumatic tires, particularly in the large size tires, such as those used by off-the-road equipment, it has become necessary to provide efficient means to stitch the numerous plies, as well as the tread to the tire carcass in a uniform controlled manner to assure accurate and consistent stitching. Heretofore in the construction of small size tires, as for passenger cars, the operator could effectively stitch the plies and tread by hand. Considerable progress has been made in mechanizing this operation; however, these changes have been directed to lever arrangements wherein the pivoting action is based on complex movements of levers. Such arrangement has not been satisfactory for large size tires.

SUMMARY OF THE INVENTION

The present invention comprises stitching means mounted on carriages that are movable on curvilinear tracks and operated by a curved rack and pinion means to perform an accurate stitching operation similar to the profile of a finished tire.

BRIEF DESCRIPTION OF THE DRAWINGS

FIG. 1 is a side elevational view of the stitching apparatus of a preferred embodiment of the invention;

FIG. 2 is a plan view of the apparatus shown in FIG. 1; and

FIG. 3 is a front elevational view of the apparatus shown in FIG. 1.

DETAILED DESCRIPTION

Referring to the drawings wherein like reference numerals designate like or corresponding parts throughout the several views there is shown in FIG. 1 a base plate 10 having a pair of spaced, longitudinally extending guide rails 11 which form a pair of channels to receive the respective guide rollers 12 of a carriage 13 mounted thereon. A reversible drive motor 14, mounted on a rear portion of the base plate 10, is operatively connected to a lead screw 15 journaled in suitable spaced bearing. The lower portion of the carriage 13 is operatively connected to the lead screw 15, as by a nut 16 which in cooperation with the guide rollers 12 guide the reciprocal movement of the carriage 13 on the base plate 10. The lower portion of carriage 13 has a plurality of rollers 17 with vertically disposed axes to facilitate the guiding of carriage 13 on the base plate 10. Mounted on the upper end portion of carriage 13 is an arcuately shaped support 18 having on its upper surface portion an arcuately shaped cam guideway 19, a pair of arcuately shaped gear sectors 20—20 and an arcuately shaped planar guide surface 21 on the outer edge thereof to operate as guideways in a manner to be described. Mounted on arcuately shaped support 18 for movement thereon are a pair of cross slides 22—22. Each cross slide 22 has a pair of spaced follower rollers 23—23 which are slidingly received by the guideways 19 to guide the arcuate movement of such cross slides 22—22 on the arcuately shaped support 18. Journaled on the bottom of each cross slide 22 is a spur gear 24 which meshes with the gear sector 20. Mounted on the rear portion of each cross slide 22 is a motor transmission means 25 having its output connected to drive gear 24 which moves the cross slide 22 on the support 18. Each cross slide 22 has pairs of rollers 26 mounted at the respective corners thereof captively engaging the arcuately shaped upper planar edge surface and the lower edge of the support 18 to maintain the cross slide in rolling engagement relative to the support 18. The respective guideways 19 and gear sectors 20—20 are contoured to the shape of the motion desired to be imparted to the respective cross slides which in the instant case is on a curve identical to the outer surface of the finished shape desired. As shown in FIGS. 1 and 2, a bracket 28 is mounted on the rear portion of each cross slide 22 to pivotally support one end of an air cylinder 30 whose piston rod 31 is pivotally connected to the intermediate portion of a pair of lever members 32, 32. The lower portion of the respective lever members 32 are pivotally connected to a bearing support 33 which is suitably attached to the adjacent associated cross slide 22 as by plate members 34, 34. The respective upper portions of each lever arm 32, 32 are connected to a bushing 35 which support a stitching wheel 36. The intermediate portion of each lever member 32, 32 pivotally support the rod end of cylinders 30 which operates to move the respective stitching wheels clockwise as viewed in FIG. 1 to the position shown in phantom lines in FIG. 1 such that the stitching wheels 36—36 journaled on bushings 35—35 are adapted to abuttingly engage a formed green tire 37 mounted on a cylindrical tire drum shown only partially in FIG. 1. Pressurization of the rod end of air cylinder 30 operates to withdraw the stitching wheels 36 to the position shown in full lines in FIG. 1.

In the operation of the apparatus described, assuming that a formed green tire 37 is suitably supported on a rotatably driven tire drum, the operator initially energizes drive motor 14 which rotates lead screw 15 to move the carriage 13 forwardly toward the green tire 37 to a predetermined portion. Thereafter, the head end of air cylinder 30 is pressurized which pivots the stitching wheels 36—36 clockwise as seen in FIG. 1 into abutting engagement with the green tire 37; after which, motor transmission means 25 is energized which rotates spur gears 24—24, which gears 24—24 mesh with respective gear sectors 20 thereby moving the respective cross-slides 22—22 arcuately outwardly away from each other with the respective stitching wheels in rolling engagement with the green tire 37 in accordance with the dictates of rollers 23—23 engaging guideways 19. Suitable limit switches may be employed in a manner old and well known in the art to stop motor 25 and reverse the rotation of gears 24—24 to return the slides 22—22 to their starting position simultaneously with the energization of motor 14 to return the carriage 13 to its starting position while pressurizing the rod end of cylinder 30 and exhausting the head end of cylinder 30 to thereby move the stitching wheels to the full line position shown in FIG. 1.

Various modifications are contemplated and may obviously be resorted to by those skilled in the art without departing from the described invention, as hereinafter defined by the appended claims, as only a preferred embodiment thereof has been disclosed.

What is claimed is:

1. A tire building machine with a rotatable tire drum comprising a base plate mounted adjacent to said tire building drum, a carriage mounted on said base plate for longitudinal movement thereon, drive means mounted on said base plate and operatively connected to said carriage for moving said carriage, a support mounted on said carriage, said support having arcuately shaped guideways and an arcuately shaped gear sector whose radius of curvature have a common center, a pair of cross slides mounted on said support for movement thereon, each cross slide having follower roller means mounted thereon operatively engaging said arcuately shaped guideways for guiding said cross slide in a curvilinear path, gear means on each of said cross slides, a drive motor mounted on each cross slide operatively connected to said gear means which mesh with said gear sectors to drive said gears, stitching wheels pivotally mounted on said cross slide with the axis of rotation of said tire building drum, and power operated means interconnecting said stitching wheels and said cross slides for moving said stitching wheels toward and away from said formed green tire or building drum.

2. A tire building machine as set forth in claim 1 wherein said base plate has a pair of longitudinal extending guide rails, and the projections of said axes of said stitching wheels in one position and said tire building drum on a horizontal plane containing said guide rails being normal to said guide rails.

3. A tire building machine as set forth in claim 2 wherein each of said cross slides has a plurality of rollers captively engaging said support for guiding the arcuate movement of said cross slide on said support and said drive motor operative to drive said gear means for each of said cross slides in opposite directions to move said cross slides toward and away from each other in unison.

4. A tire building machine as set forth in claim 3 wherein said arcuately shaped guideways define the arcuate outer tread profile of a passenger tire.

References Cited

UNITED STATES PATENTS 1,475,300  11/1923  Harsel _____ 156—410X

BENJAMIN A. BORCHELT, Primary Examiner

S. C. BENTLEY, Assistant Examiner